(12) United States Patent
Hukkanen (10) Patent No.: US 11,225,292 B2
(45) Date of Patent: Jan. 18, 2022

(54) ARRANGEMENT AND METHOD FOR LEVELLING A CAB OF A WORK MACHINE

(71) Applicant: Ponsse Oyj, Vieremä (FI)

(72) Inventor: Pentti Hukkanen, Vieremä (FI)

(73) Assignee: PONSSE OYJ, Vieremä (FI)

(*) Notice: Subject to any disclaimer, the term of this patent is extended or adjusted under 35 U.S.C. 154(b) by 0 days.

(21) Appl. No.: 16/958,227

(22) PCT Filed: Dec. 27, 2018

(86) PCT No.: PCT/FI2018/050979
§ 371 (c)(1),
(2) Date: Jun. 26, 2020

(87) PCT Pub. No.: WO2019/129931
PCT Pub. Date: Jul. 4, 2019

(65) Prior Publication Data
US 2020/0331541 A1 Oct. 22, 2020

(30) Foreign Application Priority Data

Dec. 29, 2017 (FI) .................................. 20176202

(51) Int. Cl.
*B62D 33/067* (2006.01)
*B62D 33/073* (2006.01)
*B62D 33/10* (2006.01)

(52) U.S. Cl.
CPC ......... *B62D 33/067* (2013.01); *B62D 33/073* (2013.01); *B62D 33/10* (2013.01); *B60G 2204/162* (2013.01)

(58) Field of Classification Search
CPC .... B62D 33/067; B62D 33/073; B62D 33/10; B62D 33/063; B62D 33/08; B60G 2204/162
See application file for complete search history.

(56) References Cited

U.S. PATENT DOCUMENTS

| | | | | |
|---|---|---|---|---|
| 4,326,571 A | * | 4/1982 | Crawford | E02F 9/028 144/34.5 |
| 4,650,017 A | * | 3/1987 | Pelletier | A01G 23/083 180/41 |

(Continued)

FOREIGN PATENT DOCUMENTS

| | | | | |
|---|---|---|---|---|
| DE | 34 05 921 | | 9/1985 | |
| EP | 2045174 B1 | * | 11/2010 | E02F 9/028 |

(Continued)

OTHER PUBLICATIONS

"Ponsse Scorpion", Ponsse Brochure, retrieved Feb. 27, 2019, 8 pages.

(Continued)

Primary Examiner — James A English
Assistant Examiner — Matthew D Lee
(74) Attorney, Agent, or Firm — Nixon & Vanderhye PC (57) ABSTRACT

A cabin (12) of a mobile work machine (10) is adaptable to a frame of the work machine by means of an arrangement (1) which comprises longitudinal levelling means (2) for levelling the cabin in the direction of longitudinal tilting (A) of the work machine, and transverse levelling means (20) for levelling the cabin in the direction of sideward tilting (H), transverse in relation to the longitudinal direction (B) of the work machine, with respect to transverse pivoting axle (J). The transverse pivoting axle extends in a substantially orthogonal horizontal direction in relation to the longitudinal pivoting axle (C), and is adapted at a lower height than the longitudinal pivoting axle.

15 Claims, 4 Drawing Sheets

(56) References Cited

U.S. PATENT DOCUMENTS

| | | | | |
|---|---|---|---|---|
| 6,105,699 | A * | 8/2000 | Hinds | B62D 33/063 180/89.13 |
| 6,135,225 | A * | 10/2000 | Barsic | B62D 33/063 180/89.14 |
| 6,173,973 | B1 * | 1/2001 | Robinson | B62D 33/063 144/34.1 |
| 6,241,263 | B1 * | 6/2001 | Hicks | B60G 9/02 180/89.14 |
| 6,273,203 | B1 | 8/2001 | Paggi et al. | |
| 7,832,740 | B2 * | 11/2010 | Kim | E02F 9/028 280/6.154 |
| 2003/0047367 | A1 * | 3/2003 | Vaile | B62D 55/075 180/89.14 |
| 2021/0024148 | A1 * | 1/2021 | Selvam | B62D 55/112 |

FOREIGN PATENT DOCUMENTS

| | | | | |
|---|---|---|---|---|
| KR | 20170122614 A * | 11/2017 | | B62D 33/067 |
| SE | 509 528 | 2/1999 | | |
| WO | WO-9416155 A1 * | 7/1994 | | B62D 55/116 |
| WO | WO-9901329 A1 * | 1/1999 | | B62D 33/0604 |
| WO | WO-2007139878 A2 * | 12/2007 | | B60G 17/0165 |
| WO | 2008/016310 | 2/2008 | | |
| WO | WO-2008016310 A1 * | 2/2008 | | B62D 33/067 |
| WO | 2010/056193 | 5/2010 | | |

OTHER PUBLICATIONS

Action Search Report for FI Application No. 20176202 dated Jun. 4, 2018, 2 pages.

International Search Report and Written Opinion of the ISA for PCT/FI2018/050979 dated Feb. 28, 2019, 13 pages.

* cited by examiner

Guiding cabin of work machine towards horizontal position in relation to at least the longitudinal tilting of the work machine by an arrangement for levelling cabin of mobile work machine — 61

ARRANGEMENT AND METHOD FOR LEVELLING A CAB OF A WORK MACHINE

This application is the U.S. national phase of International Application No. PCT/FI2018/050979 filed Dec. 27, 2018 which designated the U.S. and claims priority to FI Patent Application No. 20176202 filed Dec. 29, 2017, the entire contents of each of which are hereby incorporated by reference.

BACKGROUND

The invention relates to work machines and in particular to an arrangement and method for levelling a cabin of a work machine.

Longitudinal and transverse swaying of a work machine cabin while it is moving on uneven terrain causes major problems from the viewpoint of the driver's ergonomics. In addition, when the work machine halts to carry out tasks, it is essential from the viewpoint of the driver's ergonomics that the cabin and the driver's post may be quickly brought to a position substantially corresponding to a horizontal surface. In the usage environment of a forest machine, the inclinations and roughness of the terrain may be substantial, requiring rather large play and levelling angles from the levelling. The problem often encountered is, however, the relatively cramped layout of the forest machine, in which space in the longitudinal direction of the machine is typically rather limited.

BRIEF DISCLOSURE

The object of the invention is thus to develop a new arrangement and method for levelling a cabin of a work machine, characterized by what is stated in the independent claims. Preferred embodiments of the invention are disclosed in the dependent claims.

The invention is based on that the arrangement comprises longitudinal levelling means for levelling the cabin in the direction of longitudinal tilting of the work machine, and transverse levelling means for levelling the cabin in the direction of sideward tilting, transverse in relation to the longitudinal direction. A transverse pivoting axle extends in a substantially orthogonal horizontal direction, in relation to a longitudinal pivoting axle, and is adapted at a lower height than the longitudinal pivoting axle.

The advantage of the invention is that the swaying of the cabin may be significantly reduced by an arrangement that minimises the need for extra space, in particular in the longitudinal direction of the work machine, whereby a particular play allowing longitudinal levelling may be accomplished in a work machine shorter than previously, and/or a play larger than previously and allowing longitudinal levelling may be accomplished in a work machine of a particular length. In other words, in a work machine frame having a particular length may, thanks to the method and arrangement now disclosed, a larger play and larger levelling angles may be set up insofar as at least the longitudinal levelling of the cabin is concerned than in the known solutions. In addition, the solution may improve the driver ergonomics when known cabins are adapted on known frame parts. In other words, the solution is well suited to modular production, too.

BRIEF DESCRIPTION OF THE DRAWINGS

The invention will now be described in more detail in connection with preferred embodiments and with reference to the accompanying drawings, in which.

The figures are not to scale, and some features may have been simplified, emphasised or faded out to improve the clarity of the essential features of the figures.

DETAILED DESCRIPTION OF THE INVENTION

Figure 1:
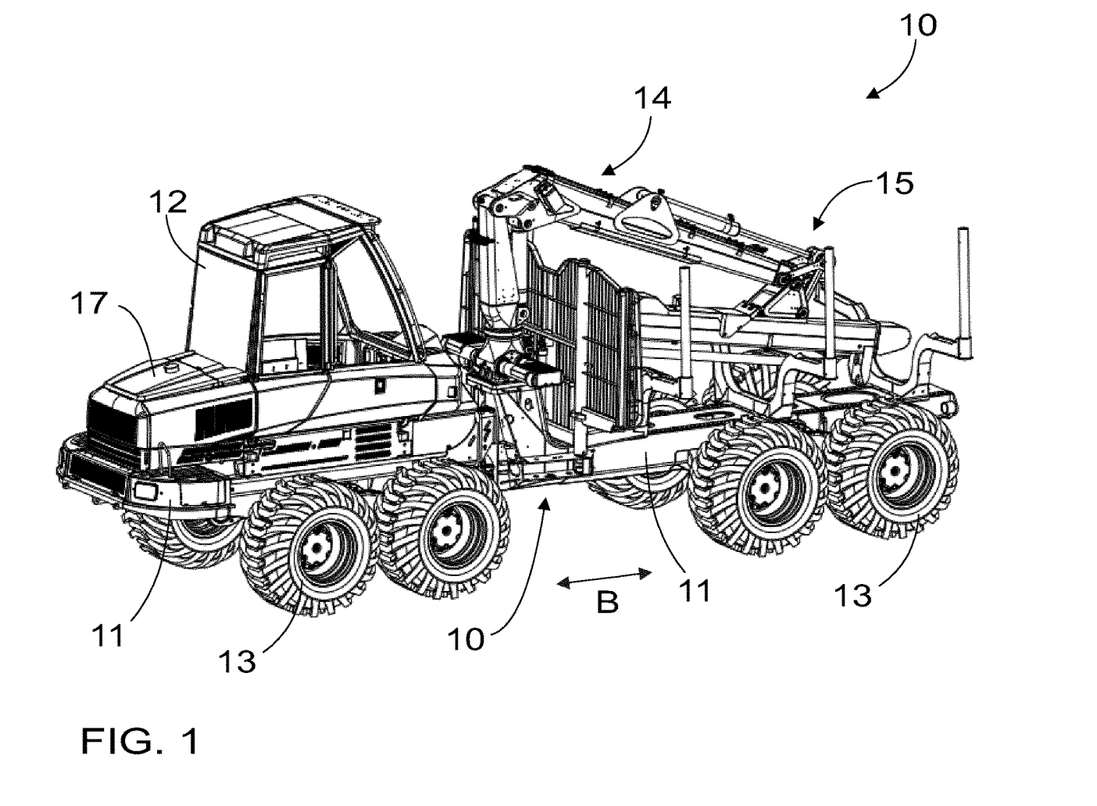
FIG. 1 shows work machine.

FIG. 1 shows a mobile work machine 10, to be more precise, a forest machine, and to be even more precise, a forwarder. In different embodiments, the work machine 10 may also comprise another forest machine, such as a forestry vehicle suitable for carrying another type of load, a harvester, or a combination of a forwarder and harvester, or another forest machine or another work machine moving on uneven terrain.

The mobile work machine 10 may comprise one or more frame parts 11 and a cabin 12 adapted to at least one frame part. The work machine 10 may further comprise moving means 13, which moving means 13 may comprise at least one of the following: wheels adapted on an axle, wheels adapted on a swinging axle, wheels adapted on a tandem axle, a track system or another means known per se to cause the work machine to move in relation to its working surface. It is obvious for a person skilled in the art that typically the work machine additionally comprises numerous structural and functional components and entities that depend on the work machine type, such as a boom structure 14, cargo space 15, tool (not shown), power source 17 and so forth. The tool may comprise a hoisting member, such as a load bucket and/or a wood handling tool, such as a harvester head.

The mobile work machine 10 may further comprise an arrangement 1 for levelling the cabin 12 of the work machine 10. The cabin 12 may be adaptable to at least one frame part 11 of the work machine 10. In this context, levelling refers to guiding the cabin 12 towards the horizontal position regardless of the obstacles and surface contours of the working surface as well as the tilting that these apply to the frame part of the work machine 10, in particular to the frame part 11 to which the cabin 12 is adapted. In other words, by means of levelling, the cabin may be brought into the desired position, such as the horizontal position in relation to the longitudinal tilting and/or transverse tilting, in other words sideward tilting, of the work machine regardless of the tilting of the frame part, caused by the working surface, when the cabin 12 is adapted on the frame part 11 of the work machine.

Figure 2:
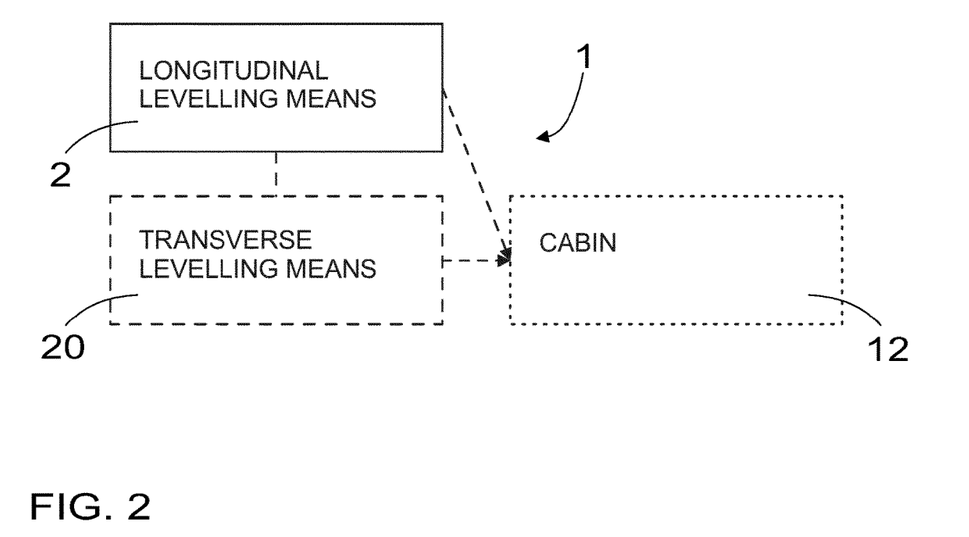
FIG. 2 is a schematic view of an arrangement for levelling a cabin of a work machine.

FIG. 2 is a schematic view of an arrangement 1 for levelling a cabin of a work machine 10. The arrangement 1 may comprise longitudinal levelling means 2 to level the cabin in the direction of longitudinal tilting A of the work machine. The cabin 12, shown by a dotted line in FIG. 2, may in other words be guided towards the horizontal position in relation to the direction of longitudinal tilting A of the work machine, by means of the longitudinal levelling means 2. In an embodiment, the arrangement 1 for levelling a cabin of a work machine 10 may further comprise transverse levelling means 20. In FIG. 2, the transverse levelling means are shown with a dotted line. FIGS. 3 to 9 are schematic views of some of the different embodiments, details and principles of such embodiments of such an arrangement 1.

Figure 3:
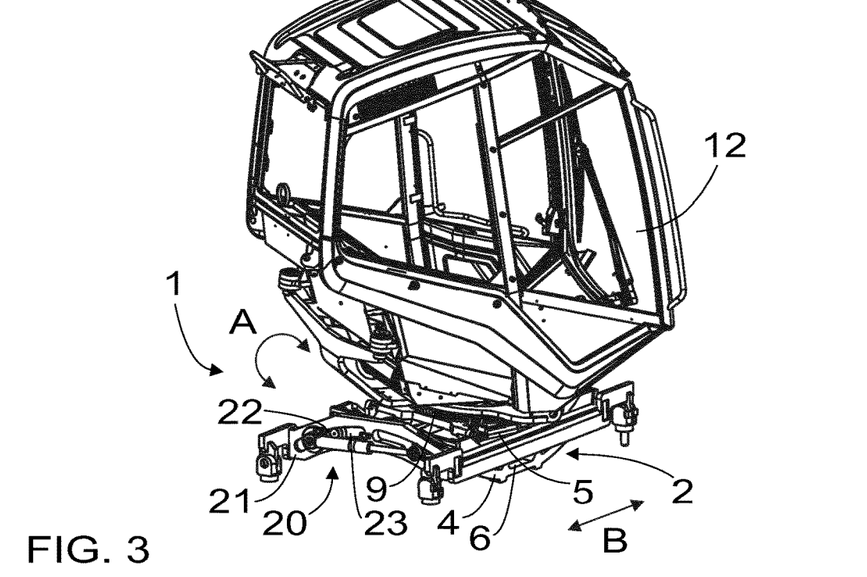
FIG. 3 is a schematic perspective view of an embodiment of an arrangement for levelling a cabin of a work machine.
Figure 4:
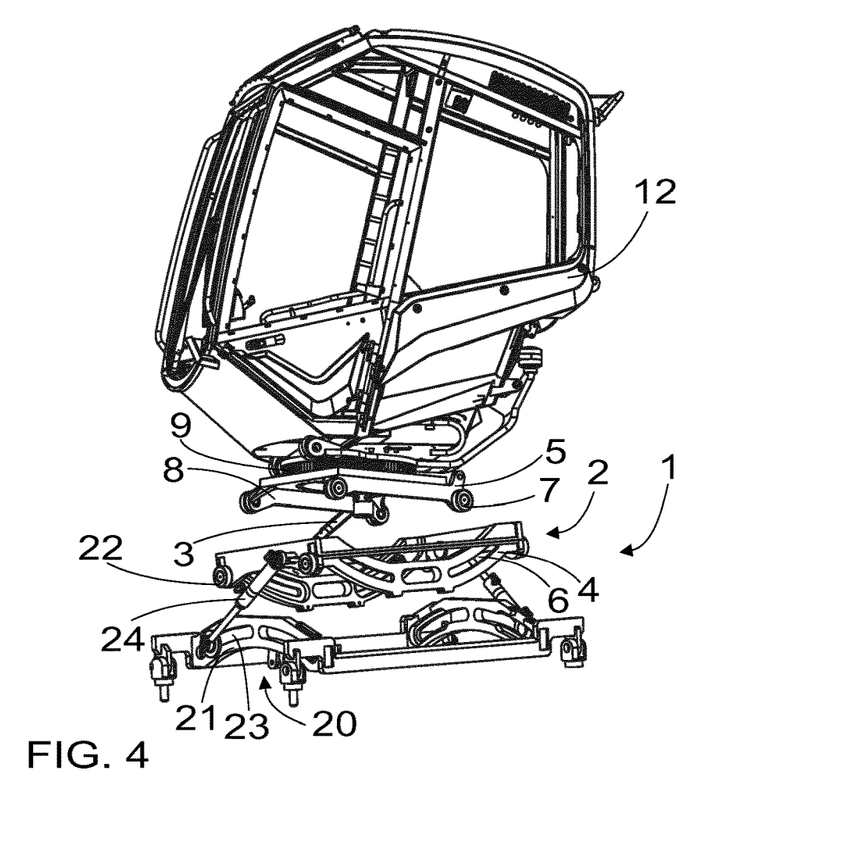
FIG. 4 is a schematic perspective exploded view of the embodiment of FIG. 3.
Figure 5A:
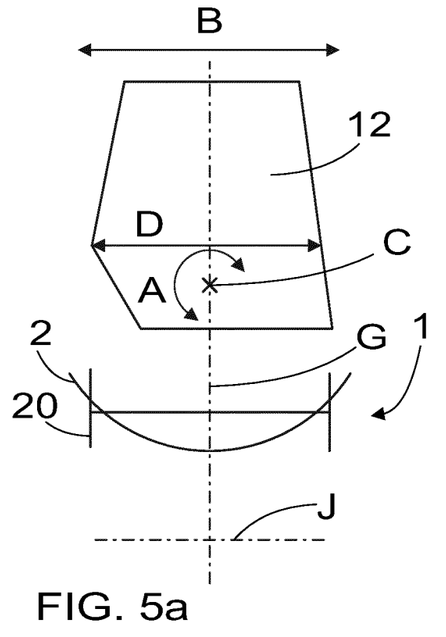
FIGS. 5a and 5b are schematic views of some features and principles of an arrangement according to an embodiment for levelling a cabin of a work machine.
Figure 5B:
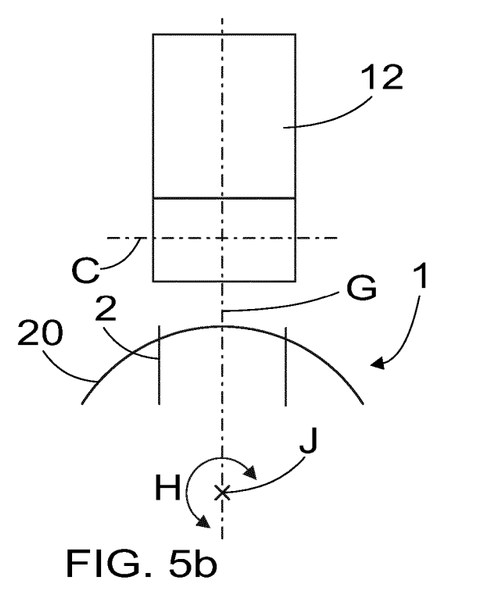

FIG. 3 is a schematic perspective view of an embodiment of an arrangement 1 for levelling a cabin 12 of a work machine, and FIG. 4 is a schematic perspective exploded view of the embodiment of FIG. 3. As is obvious for a person skilled in the art, in FIG. 4 the cabin 12 and arrangement 1 are shown from a different angle than in FIG. 3. FIGS. 5a and 5b are schematic views of an embodiment of the arrangement 1, and more specifically some features and principles of the arrangement 1 for levelling a cabin of a work machine, with the aim to illustrate the pivoting axles and directions, in particular. FIG. 5a is a side view of the arrangement 1, and FIG. 5b a rear view. Although FIGS. 3 to 5b and 8 to 9 show embodiments where the arrangement 1 comprises both longitudinal levelling means 2 and transverse levelling means 20, the arrangement 1 does not necessarily comprise the transverse levelling means 20 in all the embodiments.

The longitudinal levelling means 2 may be adaptable to connect the cabin 12 to the frame of the work machine 10, to be more precise to at least one frame part 11, rotatably in relation to a longitudinal pivoting axle C that is horizontal and transverse and substantially orthogonal with respect to the longitudinal direction B of the work machine frame. In other words, the longitudinal levelling means 2 may be arranged to level the cabin 12 in relation to the longitudinal tilting A of the work machine, that is, to guide the cabin towards the horizontal position in relation to the longitudinal tilting A of the work machine when the longitudinal levelling means 2 are adapted to at least one frame part 11 of the work machine and the cabin 12 is adapted on this frame part 11 by means of the arrangement 1. Depending on the embodiment, the levelling may take place by rotating the cabin 12 in relation to the longitudinal pivoting axle C or allowing the rotation of the cabin 12 in relation to the longitudinal pivoting axle C.

The longitudinal pivoting axle C is advantageously adapted to set itself, in relation to the work machine cabin, on such a line at which the length D of the cabin is the largest in the longitudinal direction of the work machine frame when the arrangement 1 is adapted on at least one frame part 11 of the work machine 10. In other words, the longitudinal pivoting axle is advantageously adapted to place itself, in relation to the work machine cabin, on such a line at which the length of the cabin is the largest in the longitudinal direction of the work machine, or at a distance of no more than 0.2 m from such a line when the arrangement is adapted on the work machine, that is, at least one frame part 11 of the work machine 10. This allows the levelling of the cabin 12 in the smallest possible movement capacity in the longitudinal direction B of the work machine frame.

In the embodiment of FIG. 5 the line at which the length of the cabin is the largest in the longitudinal direction of the work machine frame is substantially at the arrow D and extends in the horizontal direction in the neutral, nontilted, position of the cabin 12, as shown in FIG. 5a. In other words, the length D of the cabin refers to the largest length in the longitudinal direction B of the work machine frame, extending in parallel with the longitudinal direction B of the work machine frame. In this case, the points defining the length D of the cabin are on the same horizontal line in the neutral position of the cabin.

In an embodiment, the longitudinal pivoting axle C may be adapted in the longitudinal direction of the work machine, so in the longitudinal direction B of the work machine, in the area of the centremost one third of the cabin 12 as examined along such a line at which the length of the cabin in the longitudinal direction of the work machine is the largest. In other words, the longitudinal pivoting axle C may be adapted in the area of the centremost one third of the line determining the largest length D of the cabin 12 in the longitudinal direction B of the work machine frame. This area is thus located, as seen from the side, as in FIG. 5a, in the area of the centremost one third of the cabin 12. In the embodiment of FIG. 5a, the longitudinal pivoting axle C is adapted, in the longitudinal direction B of the work machine frame, at the centre of the line defining the largest length D of the cabin.

In an embodiment, the longitudinal pivoting axle C may be adapted, in the longitudinal direction of the work machine, that is the longitudinal direction B of the work machine frame, when examined along a line at which the length of the cabin in the longitudinal direction of the work machine is the largest, at a distance of no more than 0.5 m from the centre of the line in question, that is, the line determining the largest length D of the cabin 12 in the longitudinal direction B of the work machine frame.

In FIG. 5a the centre point or centre of the line at which the length of the cabin in the longitudinal direction of the work machine is the largest, falls at substantially the same place as the vertical axle G.

FIGS. 5a and 5b are schematic view of longitudinal levelling means 2 and the longitudinal pivoting axle C they form. Depending on the embodiment, the longitudinal pivoting axle C may comprise a pivot axle of physical pivoting or a computational rotation axle of the rotation movement of the cabin 12, caused or made possible by the longitudinal levelling means 2.

In an embodiment, the longitudinal levelling means 2 comprise at least one first actuator 3 which is adaptable to guide the cabin 12 towards the horizontal position in relation to the longitudinal tilting A of the work machine 10. In other words, the actuator 3 may be adaptable to bring the cabin 12 towards the horizontal position in relation to the longitudinal tilting A of the work machine 10 when the arrangement 1 is adapted to the work machine 10, in particular at least on one frame part 11. The first actuator may comprise a pressure-medium-operated actuator, such as a hydraulic actuator, for example at least one hydraulic cylinder.

FIGS. 3 and 4 thus shows an embodiment of the arrangement 1. The longitudinal levelling means 2 may in such a case comprise at least one curved guide 4. The centre of curvature of the curved longitudinal guide 4 may then fall on the longitudinal pivoting axle C. The curved longitudinal guide 4 may be installable to the work machine 10 so that the longitudinal direction of the curved longitudinal guide 4 is substantially parallel to the longitudinal direction B of the work machine when the arrangement 1 is installed to the work machine 10.

The longitudinal levelling means 2 may further comprise at least one mounting structure 5. The mounting structure 5 may be adapted to connect to at least one curved longitudinal guide 4 movably to move on a curved path along at least one curved longitudinal guide 4. In such a case in an embodiment the cabin 12 may be adapted immovably to at least one curved longitudinal guide 4 in relation to at least the longitudinal tilting of the curved longitudinal guide 4, and at least one mounting structure 5 may be adapted immovably in relation to at least the longitudinal tilting of the curved longitudinal guide 4 to the frame of the work machine, for example to at least one frame part 11. Correspondingly, in a second embodiment the cabin 12 may be adapted immovably to at least one mounting structure 5 in relation to at least the longitudinal tilting of the curved longitudinal guide 4, and at least one curved mounting structure 4 may be adapted immovably in relation to at least the longitudinal tilting of the curved longitudinal guide 4 to the frame of the work machine, for example to at least one frame part 11.

Curvature of the longitudinal guide 4 means that the longitudinal guide 4 may accomplish the rotation of the cabin 12, or the rotation becoming possible, along a curved path when the cabin 12 is adapted to the frame part 11 by means of the arrangement 1. In other words, the appearance of the longitudinal guide may be curved, but it need not be curved in all the embodiments, if the coupling of the mounting structure 5 to the longitudinal guide 4 has been otherwise so arranged that it establishes a curved path of the cabin 12, corresponding to the rotation around the longitudinal pivoting axle C.

In an embodiment, such as the embodiment of FIG. 4, the curved longitudinal guide 4 has a concave form so that the lowest point of the path formed by the curved longitudinal guide 4 is, in the longitudinal direction of the curved longitudinal guide 4, at the centre part of the curved longitudinal guide 4. In other words, the curved longitudinal guide 4 may be so adapted in the arrangement 1 that in the usage position, adapted to the frame part 11 of a work machine, for example, the point of the path caused by the longitudinal guide 4, falling closest to the usage surface such as the working surface is, in the longitudinal direction of the curved longitudinal guide 4 and thus also when installed to the work machine in the longitudinal direction B of the work machine frame, in the centre area of the longitudinal guide.

In an embodiment, such as in the embodiment of FIG. 4, at least one curved longitudinal guide 4 may comprise a first curved slot 6 formed in the longitudinal guide. The mounting structure 5 may correspondingly comprise at least one slide structure 7 which couples to the first slot 6 of each curved longitudinal guide 4, movably in the slot 6, and supported by which the mounting structure 5 rests on the curved longitudinal guide 4. The first slide structure may comprise a roll, a set of rolls, bearing, slide surface, or another slide structure known per se and allowing a sliding motion between the mounting structure 5 and the longitudinal guide 4, or a combination of such structures.

In an embodiment, the longitudinal levelling means 2 may comprise at least two curved longitudinal guides 4. The mounting structure 5 may in such a case comprise a mounting frame, which comprises at least two longitudinal portions 8 extending in the longitudinal direction of the curved longitudinal guide 4, to each end of which a first glide structure 7 is adapted, movably coupling to the curved longitudinal guide 4. Each longitudinal portion 8 of the mounting frame may in this case be correspondingly adapted to one of the curved longitudinal guides 4.

In an embodiment, the longitudinal levelling means 2 may comprise at least one first actuator 3 which first actuator is on the one hand adapted to the curved longitudinal guide 4 or a mounting part immovably adapted to the longitudinal guide 4, and on the other hand to the mounting structure 5 or a structural part immovably adapted to the mounting structure 5 so that the cabin 12 may be guided towards the horizontal position in relation to the longitudinal tilting A of the work machine so that the first actuator 3 causes a motion forming the mutual curved path between the curved longitudinal guide 4 and mounting structure 5. In this case, the computational centre of curvature of the path may be located on the longitudinal pivoting axle C.

In an embodiment, a bearing 9 may be adapted in the curved longitudinal guide 4 and/or mounting structure 5 to adapt the cabin 12 rotatably in relation to the work machine frame, in particular rotatably around the substantially vertical axle G.

In an embodiment, the longitudinal levelling means 2 may comprise a pivot installation structure, adaptable substantially immovably in relation to at least the longitudinal tilting of the work machine to the frame of the work machine and comprising a pivot point which is adapted to settle when installed to the work machine on the longitudinal pivoting axle C so that the cabin 12 may be adapted by means of the pivot point to the frame of the work machine so that when installed to the work machine the pivot installation structure allows the rotation of the cabin in relation to the longitudinal pivoting axle C.

In an embodiment, the longitudinal levelling means 2 may comprise at least two lever arms which are adaptable to the work machine frame and supported by which the cabin 12 of the work machine may be adapted so that the cabin 12 is adaptable to be rotated around the longitudinal pivoting axle C in relation to the work machine frame.

In an embodiment, the arrangement 1 may further comprise transverse levelling means 20 to level the cabin 12 in the direction of a transverse sideward tilting, in relation to the longitudinal direction B of the work machine 10, in other words transverse tilting H, in relation to a transverse pivoting axle J. The transverse pivoting axle J may in such a case extend in a substantially orthogonal horizontal direction in relation to the longitudinal pivoting axle C. In an embodiment, the transverse pivoting axle J may be adapted at a lower height than the longitudinal pivoting axle. This is particularly advantageous because the axle spacing in the transverse direction of the work machine is typically considerably shorter that in the longitudinal direction of the work machine. In this case, the levelling axle of transverse swaying, so in this embodiment the transverse pivoting axle J, is advantageous to place as low as possible. This also reduces the sideward, that is, transverse shift of the cabin during levelling when the work machine 10, or more specifically, the frame part 11 of the work machine, tilts. The transverse pivoting axle J may most advantageously be adapted below the cabin and the cardan shaft of the work machine 10 when the arrangement 1 and cabin 12 are adapted to the work machine 10.

The transverse levelling means 20 may be adapted to level the cabin in the direction of transverse tilting H in the transverse direction in relation to the longitudinal direction B of the work machine with respect to the transverse pivoting axle J. The transverse levelling means 20 may be adapted to connect the cabin 12 to the frame of the work machine 10, to the frame part 11 of the work machine, for example, rotatably in relation to the horizontal transverse pivoting axle J in the longitudinal direction B of the work machine frame. The cabin may in this case be guided towards the horizontal position in relation to the transverse tilting H in the transverse direction of the work machine by means of said transverse levelling means 20. The transverse pivoting axle J may extend in a substantially orthogonal horizontal direction in relation to the longitudinal pivoting axle C. In other words, the transverse pivoting axle J may extend in the longitudinal direction B of the work machine. In an embodiment, the transverse pivoting axle J may be adapted at a lower height than the longitudinal pivoting axle.

In an embodiment, such as the embodiment of FIG. 4, the transverse levelling means 20 may comprise at least one curved transverse guide 21 whose centre point of curvature falls on the transverse pivoting axle J. The transverse pivoting axle J may thus extend substantially orthogonally in relation to the longitudinal pivoting axle C and in a substantially rectilinear horizontal direction with the curved longitudinal guides 4. The transverse pivoting axle J may further be adapted at a lower height than the longitudinal pivoting axle C. In this case, the longitudinal direction of the curved transverse guide 21 is substantially transverse in relation to the longitudinal direction B of the work machine.

In an embodiment, such as the embodiments of FIGS. 3 and 4, the mounting structure 5 or at least one curved longitudinal guide 4 may be adapted to movably couple to at least one curved transverse guide 21 to move on a curved path along at least one curved transverse guide 21. In this case, the cabin is adaptable by means of the longitudinal levelling means 2 and transverse levelling means 20 to the frame of the work machine in order to level the cabin 12 both in the longitudinal direction of tilting of the work machine and in the transverse direction of tilting of the work machine, transverse in relation to the longitudinal direction of the work machine.

In an embodiment, such as in the embodiment of FIGS. 3 and 4, at least one curved longitudinal guide 21 may comprise a second curved slot 6 formed in the transverse guide. The longitudinal guide 4 may correspondingly comprise a second slide structure 22 which couples to the second slot 23 of each curved longitudinal guide 4, movably in the slot 23, and supported by which the longitudinal guide 4 rests on the curved longitudinal guide 21. In an embodiment, at least one second slide structure 22 may have been connected to the longitudinal guide 4. The second slide structure may comprise a roll, a set of rolls, bearing, slide surface, or another slide structure known per se and allowing a sliding motion between the longitudinal guide 4 and the transverse guide 21, or a combination of such structures.

In an embodiment, the transverse levelling means 20 comprise at least one second actuator 24 which is adaptable to guide the cabin 12 towards the horizontal position in relation to the transverse tilting H of the work machine 10. In other words, the second actuator 24 may be adaptable to bring the cabin 12 towards the horizontal position in relation to the transverse tilting H of the work machine 10 when the arrangement 1 is adapted to the work machine 10, in particular at least to one frame part 11. The second actuator 24 may comprise a pressure-medium-operated actuator, such as a hydraulic actuator, for example at least one hydraulic cylinder. In an embodiment, the transverse levelling means 20 may comprise at least one second actuator 24 which second actuator is on the one hand adapted to the curved transverse guide 21 or a mounting part immovably adapted to the curved transverse guide 21, and to the longitudinal guide 4 or structural part immovably adapted to the longitudinal guide 4 so that the cabin 12 may be guided towards the horizontal position in relation to the transverse tilting H of the work machine so that the second actuator 24 causes a motion forming the mutual curved path between the curved transverse guide 21 and curved longitudinal guide 4. In this case, the computational centre of curvature of the curved path may falls on the transverse pivoting axle J.

In an embodiment, such as the embodiment of FIG. 4, the curved transverse guide 21 has a convex form so that the highest point of the path formed by the curved transverse guide 21 is, in the longitudinal direction of the curved longitudinal guide 21, at the centre part of the curved transverse guide. In other words, the curved transverse guide 21 may be so adapted in the arrangement 1 that in the usage position, adapted to the frame part 11 of a work machine, for example, the point of the path caused by the transverse guide 21 and falling furthest from the usage surface such as the working surface is, in the longitudinal direction of the curved transverse guide 4 and thus also when installed to the work machine in the transverse direction in relation to the of the work machine frame, at the centre area of the transverse guide.

Figure 7:
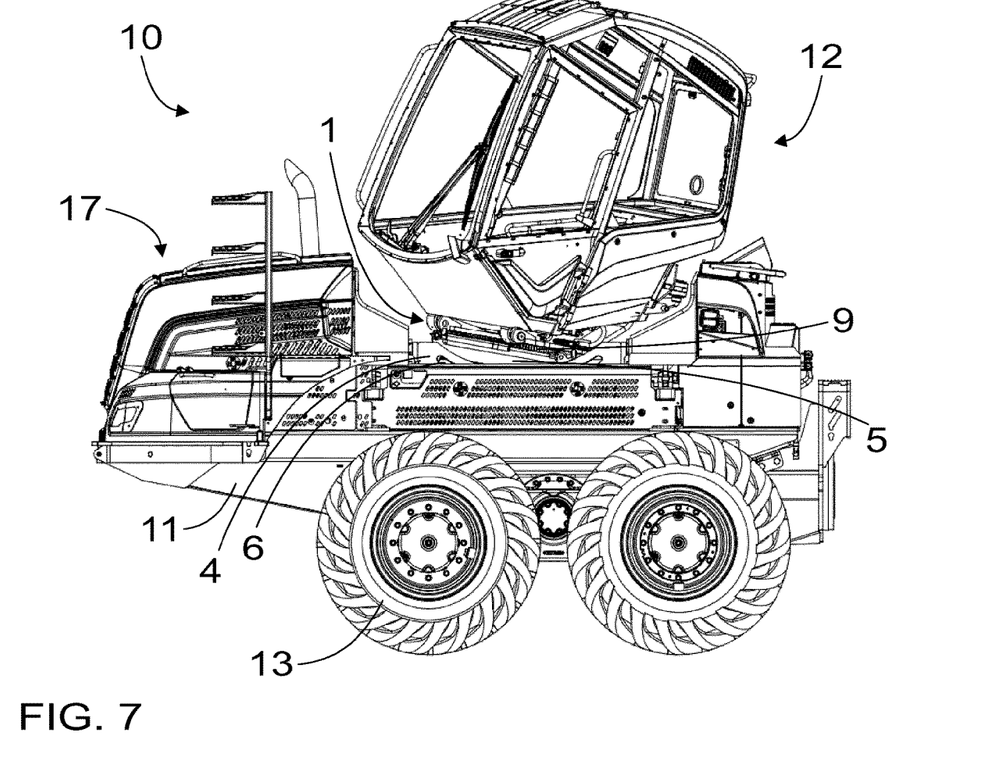
FIG. 7 is a schematic view of a work machine that comprises an arrangement for levelling a cabin.

FIG. 7 is a schematic view of a work machine 10 that comprises an arrangement 1 for levelling a cabin. The arrangement 1 may comprise an arrangement 1 described in this description and in connection with other figures to level the cabin.

Figure 8:
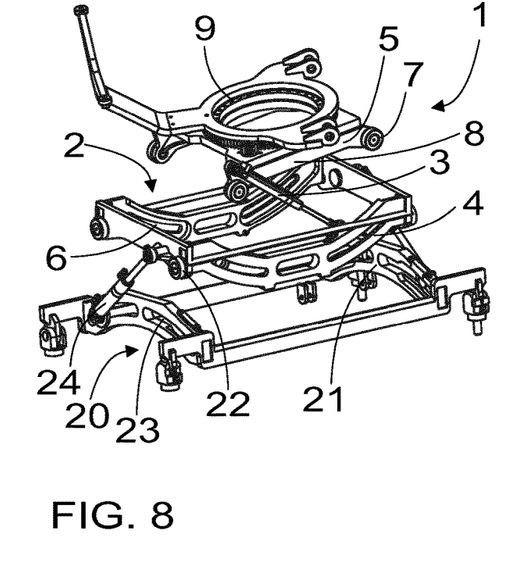
FIGS. 8 and 9 are schematic views of an arrangement from levelling a cabin of a work machine, FIG. 8 as an exploded view and FIG. 9 as assembled in a usage position.
Figure 9:
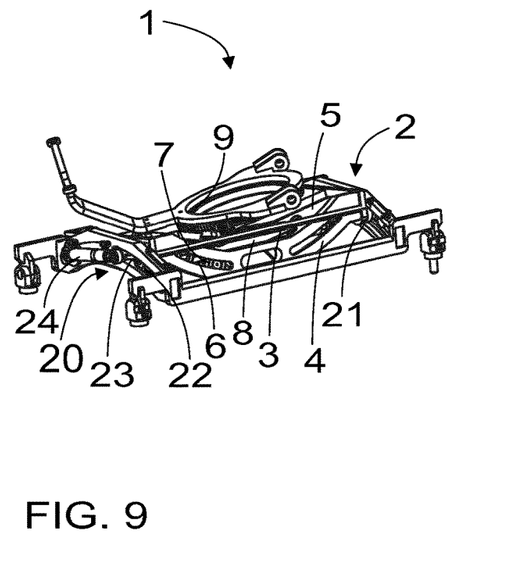

FIGS. 8 and 9 are schematic views of an arrangement from levelling a cabin of a work machine, FIG. 8 as an exploded view and FIG. 9 as assembled in a usage position. The solutions of FIGS. 8 and 9, as to their essential parts, correspond to the embodiments of FIGS. 3 and 4 and are shown to illustrate the arrangement 1 according to such an embodiment.

In an embodiment, the longitudinal pivoting axle C may be adapted at the top edge of the arrangement 1, or above it, and the transverse pivoting axle J may be adapted at the bottom edge of the arrangement 1 or below it in the usage position of the arrangement 1. In such a case, the longitudinal pivoting axle C and transverse pivoting axle J may be adapted in the height direction on opposite sides of the arrangement 1.

In an embodiment, the longitudinal levelling means 2 may be adapted to form a path for the cabin 12, the lowest point of which is at the centre of the path in the longitudinal direction B of the work machine frame. In other words, the longitudinal levelling means 2 may be adapted to form a concave path for the cabin, rotatable in relation to the longitudinal pivoting axle C.

In an embodiment, the transverse levelling means 20 may be adapted to form a path for the cabin 12, the highest point of which is at the centre of the path in the transverse horizontal direction in relation to the longitudinal direction B of the work machine frame. In other words, the transverse levelling means 20 may be adapted to form a convex path for the cabin, rotatable in relation to the transverse pivoting axle J.

In an embodiment, the cabin 12 of a work machine may be adaptable to the work machine 10, to at least one frame part 11 of the work machine, for example, by means of the arrangement 1 so that the longitudinal pivoting axle C is in the usage position adapted above the floor of the cabin 12. In an embodiment, the cabin 12 of a work machine may be adaptable to the work machine 10, to at least one frame part 11 of the work machine, for example, by means of the arrangement 1 so that the transverse pivoting axle J is in the usage position adapted below the floor of the cabin 12. In this case, due to the transverse pivoting axle J positioned low and the convex path, the sideways movement of the cabin 12 is minimized during the levelling of the cabin when the work machine 10, such as the frame part 11 of the work machine, tilts.

In an embodiment, the arrangement 1 for levelling a cabin of a work machine may form an independent structural entity, separate from the cabin and work machine frame. In another embodiment, at least part of the arrangement 1 may be formed as part of the frame of the work machine 10, such as of the frame part 11. In yet another embodiment, at least part of the arrangement 1 may be formed as part of the cabin 12 of the work machine.

Figure 6:
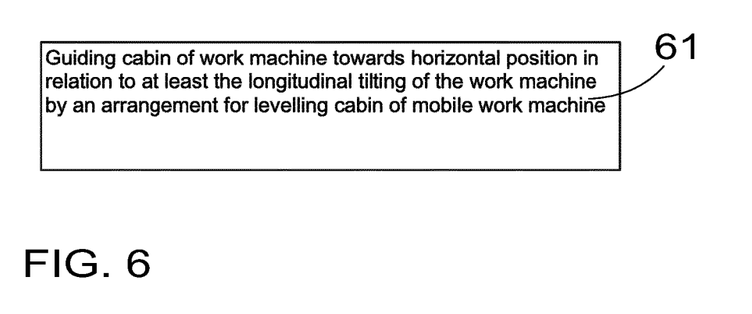
FIG. 6 is a schematic view of a method for levelling a cabin of a work machine.

FIG. 6 is a schematic view of a method for levelling the cabin 12 of the work machine 10. In the method, the cabin of the work machine may be guided 61 towards the horizontal position in relation to at least the longitudinal tilting of the work machine by an arrangement set forth in this description.

In an embodiment, the arrangement may have been formed so that the previous mounting structure of the work machine in use, or manufactured earlier, by which the cabin is adapted to the frame of the work machine, may be replaced with the arrangement 1 whereby the levelling of the cabin in accordance with an embodiment set forth in this description becomes possible.

The solutions set forth in the above are particularly advantageous in connection with mobile work machines carrying out work in uneven terrain, such as forest machines, for example, harvesters, forwarders or their combinations, which encounter a lot of swaying without levelling, and this has a direct impact on the work ergonomics of the driver of the forest machine.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. An arrangement for levelling a cabin of a mobile work machine, by means of which arrangement the cabin is adaptable to a frame of the work machine, the arrangement comprising:
   longitudinal levelling means for levelling the cabin in a direction of longitudinal tilting of the work machine so that the cabin may be guided towards a horizontal position in relation to a direction of longitudinal tilting of the work machine, by means of said longitudinal levelling means,
   whereby the longitudinal levelling means are adaptable to connect the cabin to the frame of the work machine rotatably in relation to a longitudinal pivoting axle that is horizontal and transverse and substantially orthogonal with respect to the longitudinal direction of the work machine frame, and
   transverse levelling means for levelling the cabin in a direction of sideward tilting, transverse in relation to the longitudinal direction of the work machine, with respect to a transverse pivoting axle, the transverse pivoting axle extending in a substantially orthogonal horizontal direction, in relation to the longitudinal pivoting axle, so that the cabin may be guided towards the horizontal position in relation to a transverse sideward tilting of the work machine by means of said transverse levelling means,
   whereby the transverse levelling means are adaptable to connect the cabin to the frame of the work machine rotatably in relation to the horizontal transverse pivoting axle in the longitudinal direction of the work machine frame, wherein
   the transverse pivoting axle is adapted at a lower height than the longitudinal pivoting axle, and
   the longitudinal pivoting axle is adapted at a top edge of the arrangement, or above it, and the transverse pivoting axle is adapted at a bottom edge of the arrangement or below it whereby the longitudinal pivoting axle and transverse pivoting axle are in a height direction adapted on opposite sides of the arrangement.

2. The arrangement as claimed in claim 1, wherein the longitudinal levelling means are adapted to form a path for the cabin, the lowest point of which is at the center part of the path in the longitudinal direction of the frame of the work machine.

3. The arrangement as claimed in claim 1, wherein the transverse levelling means are adapted to form a path for the cabin, the highest point of which is at the center of the path in the transverse horizontal direction in relation to the longitudinal direction of the work machine frame.

4. The arrangement as claimed in claim 1, wherein the longitudinal levelling means comprise at least one first actuator which is adaptable to guide the cabin towards the horizontal position in relation to the direction of longitudinal tilting of the work machine.

5. The arrangement as claimed in of claim 1, wherein the longitudinal levelling means comprise
   at least one curved longitudinal guide the center of curvature of which falls on the longitudinal pivoting axle and which is installable to the work machine so that a longitudinal direction of the curved longitudinal guide is substantially parallel to the longitudinal direction of the work machine, and
   at least one mounting structure adapted to connect to at least one curved longitudinal guide movably to move on a curved path along at least one curved longitudinal guide,
   whereby the cabin is provided immovably in relation to at least longitudinal tilting of the curved longitudinal guide to either at least one curved longitudinal guide or at least one mounting structure and whereby correspondingly at least one mounting structure or at least one curved longitudinal guide is adaptable immovably in relation to at least the longitudinal tilting of the curved longitudinal guide to the frame of the work machine.

6. The arrangement as claimed in claim 5, wherein at least one curved longitudinal guide comprises a first curved slot formed therein, and wherein the at least one mounting structure comprises at least one slide structure which movably couples to the first slot of each curved longitudinal guide, the at least one mounting structure resting on the curved longitudinal guide.

7. The arrangement as claimed in claim 6, wherein
   the longitudinal levelling means comprise at least two curved longitudinal guides and wherein
   the mounting structure comprises a mounting frame which comprises at least two longitudinal portions extending in the longitudinal direction of the curved longitudinal guide, to each end of which a first glide structure is adapted, movably coupling to the curved longitudinal guide,
   whereby each longitudinal portion of the mounting frame is correspondingly adapted to one of the curved longitudinal guides.

8. The arrangement as claimed in claim 5, wherein the longitudinal levelling means comprise at least one first actuator adapted to the curved longitudinal guide or a mounting part immovably provided to said longitudinal guide, and to the mounting structure or a structural part immovably provided to the mounting structure so that the cabin may be guided towards the horizontal position in relation to the direction of longitudinal tilting of the work machine so that the first actuator causes a motion forming a mutual curved path between the curved longitudinal guide and mounting structure.

9. The arrangement as claimed in claim 5, wherein a bearing is provided in the curved longitudinal guide and/or mounting structure to adapt the cabin rotatably in relation to the work machine frame.

10. The arrangement as claimed in claim 1, wherein the longitudinal levelling means comprise
a pivot installation structure, provided substantially immovably in relation to at least the direction of longitudinal tilting of the work machine to the frame of the work machine and comprising a pivot point which is adapted to settle when installed to the work machine on the longitudinal pivoting axle so that the cabin is adaptable by means of the pivot point to the frame of the work machine so that when installed to the work machine the pivot installation structure allows rotation of the cabin in relation to the longitudinal pivoting axle.

11. The arrangement as claimed in claim 1, wherein the longitudinal levelling means comprise at least two lever arms which are adaptable to the work machine frame and supported by which the cabin of the work machine is adaptable so that the cabin is adaptable to be rotated around the longitudinal pivoting axle in relation to the work machine frame.

12. The arrangement as claimed in claim 1, wherein
the transverse levelling means comprise at least one curved transverse guide whose center point of curvature falls on the transverse pivoting axle, which extends substantially orthogonally in relation to the longitudinal pivoting axle and in a substantially rectilinear horizontal direction with curved longitudinal guides, and is adapted at a lower height than the longitudinal pivoting axle whereby the longitudinal direction of the curved transverse guide is substantially transverse in relation to the longitudinal direction of the work machine, and wherein
the at least one mounting structure or at least one curved longitudinal guide is adapted to connect to at least one curved longitudinal guide movably to move on a curved path along at least one curved transverse guide,
whereby the cabin is adaptable by means of the longitudinal levelling means and transverse levelling means to the frame of the work machine in order to level the cabin both in the direction of longitudinal tilting of the work machine and in a direction of transverse tilting of the work machine, in relation to the longitudinal direction of the work machine.

13. The arrangement as claimed in claim 1, wherein said longitudinal pivoting axle is adapted to place itself, in relation to the work machine cabin, on such a line at which a length of the cabin is the largest in the longitudinal direction of the work machine frame, or at a distance of no more than 0.2 m from such a line when the arrangement is adapted to the work machine.

14. The arrangement as claimed in claim 1, wherein said longitudinal pivoting axle is adapted in the longitudinal direction of the work machine frame in the area of a centermost one third of the cabin as examined along such a line at which the length of the cabin in the longitudinal direction of the work machine is the largest, or the longitudinal pivoting axle is adapted to a distance of no more than 0.5 m from the center point of said line.

15. A method for levelling a cabin of a work machine, wherein the cabin of the work machine is guided towards the horizontal position in relation to the longitudinal tilting of the work machine by the arrangement according to claim 1.

* * * * *